United States Patent
Kragten

(10) Patent No.: US 7,416,714 B2
(45) Date of Patent: Aug. 26, 2008

(54) PREPARATION OF HYDROXYSODALITE

(75) Inventor: David D. Kragten, Burnsville, NC (US)

(73) Assignee: Unimin Corporation, New Canaan, CT (US)

( * ) Notice: Subject to any disclaimer, the term of this patent is extended or adjusted under 35 U.S.C. 154(b) by 394 days.

(21) Appl. No.: 11/391,028

(22) Filed: Mar. 28, 2006

(65) Prior Publication Data

US 2007/0237700 A1    Oct. 11, 2007

(51) Int. Cl.
*C01B 33/26*    (2006.01)

(52) U.S. Cl. ............... 423/330.1; 423/328.1; 423/328.2

(58) Field of Classification Search ............. 423/328.1, 423/328.2, 330.1
See application file for complete search history.

(56) References Cited

U.S. PATENT DOCUMENTS

| | | | |
|---|---|---|---|
| 3,760,063 | A | 9/1973 | Dreyfus et al. |
| 3,964,984 | A | 6/1976 | Vakhidov et al. |
| 4,020,147 | A | 4/1977 | Shidlovsky |
| 4,247,524 | A | 1/1981 | Leonard |
| 4,289,629 | A | 9/1981 | Andrews |
| 5,613,240 | A | 3/1997 | Lewis et al. |

FOREIGN PATENT DOCUMENTS

| | | |
|---|---|---|
| EP | 1371184 | 10/1974 |
| EP | 1410569 | 10/1975 |
| EP | 0026 394 A2 | 4/1981 |
| EP | 0307060 B1 | 3/1989 |
| EP | 0333283 B1 | 9/1989 |
| JP | 4-254409 | 9/1992 |
| JP | 7-232913 | 9/1995 |
| JP | 11-228257 | 8/1999 |
| JP | 11-236213 | 8/1999 |
| WO | WO 91/15427 | 10/1991 |

OTHER PUBLICATIONS

Krivenko et al, "Directed Synthesis of Alkaline . . . " J. Mater. Sci. (42) 2944-2952, (2007).*

The Hydrosodalite System $Na_{6+x}[SiAlO_4]_6(OH)_x \cdot nH_2o$: Formation, Phase Composition, and De- and Rehydration Studied by $^1H$, $^{23}Na$, and $^{29}Si$ MAS-NMR Spectroscopy in Tandem with Thermal Analysis, X-ray Diffraction, and IR Spectroscopy, Gunter Engelhardt, *Jurgen Felsche, and Peter Sieger, Contribution from the Faculty of Chemistry, University of Konstanz, D-7750 Konstanz, Germany, Received Mar. 6, 1991.

Synthesis and structures of $M_8[AlSiO_4]_6 \cdot (XO_4)_2, M = Na, Li, K; X = Cl, Mn$ Sodalites, Matthew E. Brenchley and Mark T. Weller, Department of Chemistry, The University of Southampton, Highfield, Southampton, UK, ZEOLITES, 1994, vol. 14, Nov./Dec.

(Continued)

*Primary Examiner*—David M Brunsman
(74) *Attorney, Agent, or Firm*—Fay Sharpe LLP; Brian E. Turung

(57) ABSTRACT

The invention is directed to a process and method for forming synthetic hydroxysodalite from nepheline and feldspar and/or nepheline syenite. A caustic material such as a solution of sodium hydroxide is combined with the nepheline and feldspar and/or nepheline syenite to form the synthetic hydroxysodalite.

28 Claims, 1 Drawing Sheet

OTHER PUBLICATIONS

Zeolification of Ashes Obtained from the Combustion of Southern's Brazil Candiota Coal.

Lieben, Nepheline Syenite Matrix Lleben Minerals b.v., Ankerkade 78 NL-6201 BP Maastricht Product Data, Quarzwerke, Treminex 958, Nepheline Syenite 120/20/2005.

Structure of Basic Sodalilte, $Na_8Al_6Si_6O_{24}(OH)_2 \cdot 2H_2O$, By I. Hassan and H.D. Grundy, Department of Geology, McMaster University, Hamilton, Ontario, Canada L8S 4L8 (Revised May 5, 1982; accepted Jul. 20, 1982).

Phases and Thermal Decomposition Characteristics of Hydro-Sodalites, J. Felsche and S. Luger, Fakultat fur Chemie, Universitat Konstanz, Postfach 5560, D-7750 Konstanz (F.R.G.) (Received Jan. 23, 1987).

The Systhesis of zeolite-P, LInde Type A, and Hydroxysodalite zeolites from paper sludge ash at low temperature (80° C.): Optimal ash-leaching condition for zeolite synthesis; Takaaki Wajima, Keiko Kuzawa, Hiroji Ishimoto, Osamu Tamada and Takashi Nishiyama.

Products Nepheline Syenite—Unimin Corporation 258 Elm Street, New Canaan, CT 06840.

Technical Data, MinBloc High Clarity Antiblocking Additives—Unimin Corporation.

* cited by examiner

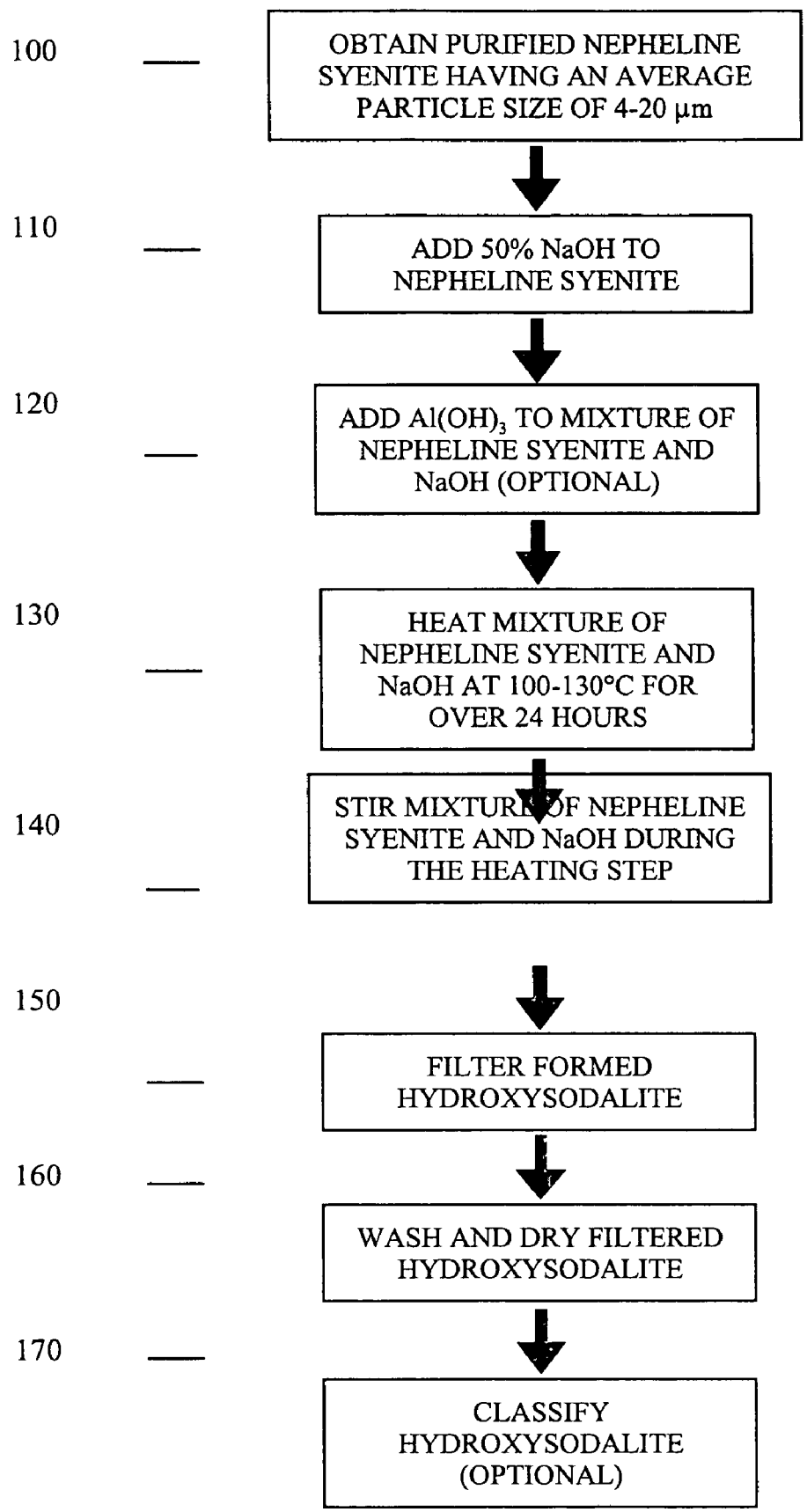

PREPARATION OF HYDROXYSODALITE

The present invention is directed to a method of preparing synthetic sodalite, and more particularly to a method for forming synthetic hydroxysodalite from nepheline and feldspar, and even more particularly to a method for forming synthetic hydroxysodalite from nepheline syenite.

BACKGROUND OF THE INVENTION

Sodalite is a naturally occurring mineral that has a variety of uses. For instance, sodalite can be used as a catalyst material, used as a filler in paints or other coating materials, use as a water softener, used as a detergent builder, used as an adsorbent, and used as a desiccant. Due to the relative scarcity of sodalite, sodalite is commonly synthesized from various materials. One known process for manufacturing sodalite is by reacting kaolinite clay with sodium hydroxide under mild hydrothermal conditions. Another known process for manufacturing sodalite involves the reaction of a silicon source, an aluminum source, and an alkali or alkaline earth under elevated temperatures as disclosed in U.S. Pat. No. 4,020,147.

Although these various processes are useful in forming sodalite, past processes for forming sodalite did not achieve high purity levels for the formed sodalite. Starting materials such as kaolinite clay can include various impurities such as iron, etc., which can adversely affect the properties of the formed sodalite (e.g., discoloration, reduced brightness, etc.). Another disadvantage with past processes for forming sodalite was associated with the resulting particle size of the formed sodalite. The formed sodalite commonly had a large average particle size. When smaller particle sizes were required, the formed sodalite had to be classified to achieve the needed particle size distribution. Such classification processes were both time consuming and costly thereby increasing the production cost of the sodalite. The formed sodalite that had a large a particle size, thereby limiting the use of the sodalite in filler applications and/or other applications that required very small particles sizes.

In view of the current state of the art, there is a need for a process that synthetically produces sodalite at high yield rates, forms a sodalite having a low impurity content and/or a has desired small particle size.

SUMMARY OF THE INVENTION

The present invention is directed to a method of preparing synthetic sodalite from nepheline and feldspar, and more particularly to a method for forming synthetic hydroxysodalite from nepheline and feldspar, and even more particularly to a method for forming synthetic hydroxysodalite from nepheline syenite. As defined herein, nepheline has the general formula of $NaAlSiO_4$; however, however, one or more of the Na ions can be substituted or other metal ions (e.g., alkali metals, alkaline earth metals, transition metal ions, etc.) and still fall within the definition of nepheline. For example, the formula $Na_3K(AlSiO_4)_4$ is still defined herein as nepheline. The sources of nepheline are a synthetic source (e.g., chemically formed, etc.) and/or a natural source. As also defined herein synthetic sodalite is defined herein to include hydroxysodalite, hydrosodalite, hydroxysodalite dihydrate. The general chemical formula for hydroxysodalite is $Na_8(AlSiO_4)_6(OH)_2$. The general chemical formula for hydrosodalite is $Na_6(AlSiO_4)_6 \cdot nH_2O$ wherein n is 0 to 8. The general chemical formulation of hydroxysodalite dihydrate is $Na_8(AlSiO_4)_6(OH)_2 \cdot 2H_2O$. In all of the formulas for hydroxysodalite and hydrosodalite, one or more of the Na ions can be substituted for other metal ions (e.g., alkali metals, alkali earth metals, transition metal ions, etc.) such as, but not limited to, K ions and still fall within the definition of hydroxysodalite, hydrosodalite and hydroxysodalite dihydrate for purposes of this invention. The exact phases of hydroxysodalite, hydrosodalite and hydroxysodalite dihydrate are difficult to differentiate, and in part depend on the washing steps and cleaning steps of the final products which will be described in more detail below. The general formula for sodalite is $Na_4Al_3(SiO_4)_3Cl$; however, one or more of the Na ions can be substituted for other metal ions (e.g., alkali metals, alkali earth metals, transition metal ions, etc.) such as, but not limited to, K ions and still fall within the definition of sodalite. The method and process of the present invention are not particularly directed to the formation of sodalite; however, it can be appreciated that a chorine source or a chlorine impurity that is present in the mixture used to form synthetic sodalite can result in the formation of sodalite and thereby fall within the scope of the present invention. The novel method of forming synthetic sodalite in accordance with the present invention can results in increased yield percentages of the synthetic sodalite from nepheline and feldspar and/or nepheline syenite. As defined herein nepheline syenite includes nepheline and at least one feldspar. Typically the nepheline content of the nepheline syenite is at least 10 weight percent of the nepheline syenite and less than about 75 weight percent of the nepheline syenite. In one non-limiting embodiment of the invention, a majority weight percent nepheline syenite is used to form the synthetic sodalite. In one non-limiting aspect of this embodiment, the nepheline syenite includes about 15-35 weight percent nepheline and a majority weight percent feldspar (e.g., albite, microcline, etc.). In another and/or alternative aspect of this embodiment, the nepheline syenite includes less that about 2 weight percent quartz. In still another and/or alternative aspect of this embodiment, a majority of the nepheline syenite used to form the synthetic sodalite is Minex® which is offered for sale by Unimin Corporation. The novel method of forming synthetic sodalite in accordance with the present invention can result in a higher purity of the formed synthetic sodalite. As a result of the high purity of the synthetic sodalite, a very high brightness of the formed synthetic sodalite is obtained. This highly bright material can be used for filler applications in clear coatings and/or as an anti-block agent in polymeric material. As can be appreciated, the highly bright material can have additional applications. The novel method of forming synthetic sodalite in accordance with the present invention also can result in a controlled particle size distribution of the formed synthetic sodalite. It has been found that by controlling the particle size of the nepheline and feldspar and/or nepheline syenite that is used to form the synthetic sodalite, the particle size of the resulting synthetic sodalite can be closely controlled. The control of the particle size of the synthetic sodalite is especially important when the synthetic sodalite is used as a filler material. As can be appreciated, controlled particle size distribution of the formed synthetic sodalite can be important for other applications involving the use of synthetic sodalite.

In one non-limiting aspect of the present invention, the novel process for producing synthetic sodalite from a) nepheline and feldspar and/or b) nepheline syenite results in a percentage conversion of nepheline and feldspar and/or nepheline syenite into synthetic sodalite of more than 50%. The novel process of the present invention can result in high conversion percentages for forming synthetic sodalite. In one non-limiting aspect of the invention, the percentage conversion of nepheline and feldspar and/or nepheline syenite into synthetic sodalite is at least about 60%. In another non-limiting aspect of the invention, the percentage conversion of nepheline and feldspar and/or nepheline syenite into synthetic sodalite is at least about 70%. In still another non-limiting aspect of the invention, the percentage conversion of nepheline and feldspar and/or nepheline syenite into synthetic sodalite is about 70-99%. In yet another non-limiting aspect of the invention, the percentage conversion of nepheline and feldspar and/or nepheline syenite into synthetic sodalite is about 70-90%.

In another and/or alternative aspect of the present invention, the conversion percentages of the novel process of the present invention can be increased by providing an additional aluminum source to the nepheline and feldspar and/or nepheline syenite when converting the nepheline and feldspar and/or nepheline syenite into synthetic sodalite. It is believed that some of the silica in the nepheline and feldspar and/or nepheline syenite can be lost by leaching during the conversion process. The amount of leaching can be reduced by adding a secondary source of aluminum. Care should be taken to limit or prevent the introduction of impurities from the secondary source of aluminum, since such impurities can adversely affect the brightness of the resulting synthetic sodalite and/or adversely affect other properties of the synthetic sodalite. In one non-limiting embodiment of the invention, the aluminum source can include, but is not limited to, aluminum hydroxide, aluminum oxide and/or metallic aluminum. In one specific non-limiting aspect of this embodiment, the aluminum source includes aluminum hydroxide. In another and/or alternative non-limiting embodiment of the invention, about 1 gram of nepheline syenite can be reacted with about 0.1-5 grams of aluminum oxide ($Al_2O_3$) so as to increase the aluminum. This reaction could be done by adding about 1 gram of nepheline syenite to about 0.15-7.7 grams of $Al(OH)_3$. In still another and/or alternative non-limiting embodiment of the invention, about 1 gram of nepheline syenite can be reacted with about 0.2-2 grams of aluminum oxide ($Al_2O_3$) so as to increase the aluminum. This reaction could be done by adding about 1 gram of nepheline syenite to about 0.3-3.1 grams of $Al(OH)_3$. In still another and/or alternative non-limiting embodiment of the invention, about 1 gram of nepheline syenite can be reacted with about 0.4-1 grams of aluminum oxide ($Al_2O_3$) so as to increase the aluminum. This reaction could be done by adding about 1 gram of nepheline syenite to about 0.5-1.5 grams of $Al(OH)_3$. As can be appreciated, the amount aluminum addition used will depend on the amount of nepheline syenite used in the reaction.

In another and/or alternative aspect of the present invention, the brightness of the synthetic sodalite that is formed by the process of the present invention is at least about 75 based on the Tappi T525 brightness test method. The high brightness of the material is at least partially a result of the purity of the synthetic sodalite. The incorporation of metal ions in the synthetic sodalite (e.g., iron, etc.) typically results in a reduced brightness of the formed synthetic sodalite. The process of the present invention reduces the occurrence of unwanted metal ion incorporation into the formed synthetic sodalite so as to form a material having a higher brightness as compared to synthetic sodalite formed by other prior art processes. In one non-limiting aspect of the present invention, the brightness of the synthetic sodalite that is formed by the process of the present invention is at least about 80 based on the Tappi T525 brightness test method. In another non-limiting aspect of the present invention, the brightness of the synthetic sodalite that is formed by the process of the present invention is at least about 85 based on the Tappi T525 brightness test method. In still another non-limiting aspect of the present invention, the brightness of the synthetic sodalite that is formed by the process of the present invention is at least about 90 based on the Tappi T525 brightness test method. In yet another non-limiting aspect of the present invention, the brightness of the synthetic sodalite that is formed by the process of the present invention is about 90-99 based on the Tappi T525 brightness test method.

In still another and/or alternative aspect of the present invention, the particle distribution of the formed synthetic sodalite is at least partially controlled by the particle size of the nepheline and feldspar and/or nepheline syenite used to form the synthetic sodalite. Control of the resulting particle size distribution of the formed synthetic sodalite can be used to eliminate the need to classify the formed synthetic sodalite and/or to form synthetic sodalite that has a small particle size. In one non-limiting aspect of the present invention, the average particle size of nepheline and feldspar and/or nepheline syenite used to form synthetic sodalite is less than about 200 μm (200 microns). In another non-limiting aspect of the present invention, the average particle size of nepheline and feldspar and/or nepheline syenite used to form synthetic sodalite is less than about 150 μm. In another non-limiting aspect of the present invention, the average particle size of nepheline and feldspar and/or nepheline syenite used to form synthetic sodalite is less than about 100 μm. In still another non-limiting aspect of the present invention, the average particle size of nepheline and feldspar and/or nepheline syenite used to form synthetic sodalite is less than about 75 μm. In yet another non-limiting aspect of the present invention, the average particle size of nepheline and feldspar and/or nepheline syenite used to form synthetic sodalite is about 1-50 μm. In still yet another non-limiting aspect of the present invention, the average particle size of nepheline and feldspar and/or nepheline syenite used to form synthetic sodalite is about 1-30 μm. In yet another non-limiting aspect of the present invention, the average particle size of nepheline and feldspar and/or nepheline syenite used to form synthetic sodalite is about 1-20 μm. As can be appreciated, other average particle size ranges of nepheline and feldspar and/or nepheline syenite can be used to form synthetic sodalite. Typically, the average particle size of synthetic sodalite that is formed from the nepheline and feldspar and/or nepheline syenite is less than about 100 microns. In one non-limiting aspect of the present invention, the average particle size of synthetic sodalite that is formed from the nepheline and feldspar and/or nepheline syenite is less than about 50 microns. In another non-limiting aspect of the present invention, the average particle size of synthetic sodalite that is formed from the nepheline and feldspar and/or nepheline syenite is less than about 30 microns. In still another non-limiting aspect of the present invention, the average particle size of synthetic sodalite that is formed from the nepheline and feldspar and/or nepheline syenite is less than about 0.1-25 microns. In yet another non-limiting aspect of the present invention, the average particle size of synthetic sodalite that is formed from the nepheline and feldspar and/or nepheline syenite is less than about 0.1-20 microns. In still yet another non-limiting aspect of the present invention, the average particle size of synthetic sodalite that is formed from the nepheline and feldspar and/or nepheline syenite is less than about 0.1-15 microns. As can be appreciated, other average particle size ranges of synthetic sodalite can be formed.

In yet another and/or alternative aspect of the present invention, the process used to form synthetic sodalite from synthetic sodalite involves the use of a caustic material. One non-limiting type of caustic material that can be used includes a hydroxide material. One non-limiting example of a caustic hydroxide material includes sodium hydroxide. Another non-limiting example of a caustic hydroxide material is primarily sodium hydroxide. The sodium hydroxide can be preformed solution and/or can be a solution formed by a combination of a basic material and a sodium source that reacts to at least partially form sodium hydroxide. For instance, lime (CaO) mixed with brine (NaCl solution) yields sodium hydroxide. As can be appreciated, many other or additional combinations of a basic material and a sodium source can be used to form sodium hydroxide. The caustic material is selected so as to not introduce undesired impurities into the formed synthetic sodalite (e.g., iron ions, etc.) which can adversely affect the brightness of the formed synthetic sodalite. The concentration of the caustic material is at least about a 20 weight percent solution of caustic material. In one non-limiting aspect of the present invention, the caustic material used to form synthetic sodalite from nepheline and feldspar and/or nepheline syenite is at least about a 30 weight percent solution of caustic material. In another non-limiting aspect of the present invention, the caustic material used to form synthetic sodalite from nepheline and feldspar and/or nepheline syenite is at least about a 40 weight percent solution of caustic material. In still another non-limiting aspect of the present invention, the caustic material used to form synthetic sodalite from nepheline and feldspar and/or nepheline syenite is about a 40-80 weight percent solution of caustic material. In yet another non-limiting aspect of the present invention, the caustic material used to form synthetic sodalite from nepheline and feldspar and/or nepheline syenite is about a 40-60 weight percent solution of caustic material. In still yet another non-limiting aspect of the present invention, the caustic material used to form synthetic sodalite from nepheline and feldspar and/or nepheline syenite is about a 40-60 weight percent solution of NaOH. In yet another non-limiting aspect of the present invention, the caustic material used to form synthetic sodalite from nepheline and feldspar and/or nepheline syenite is about a 50 weight percent solution of NaOH. In another non-limiting embodiment of the invention, the weight ratio of nepheline and feldspar and/or nepheline syenite to caustic solid is at least about 1:2 (e.g., 150 g Minex+500 g NaOH+500 g $H_2O$, etc.). In one non-limiting aspect of this embodiment, the weight ratio of nepheline and feldspar and/or nepheline syenite to caustic solid is at least about 1:4. In another non-limiting aspect of this embodiment, the weight ratio of nepheline and feldspar and/or nepheline syenite to caustic solid is at least about 1:10. The selection of the concentration of the caustic material in combination with the weight ratio of nepheline and feldspar and/or nepheline syenite to caustic solid is used to achieve the desired conversion rate of nepheline and feldspar and/or nepheline syenite to synthetic sodalite. The time at which the conversion of nepheline and feldspar and/or nepheline syenite to synthetic sodalite can be at least partially controlled by controlling the temperature of the reaction. Generally, the temperature of the reaction is maintained at least about 60° C. More typically, the temperature of the reaction is maintained at least about 80° C. Lower temperatures can be used, but will result in a significant reduction in the rate of reaction and/or adversely affect the final conversion percentage of nepheline and feldspar and/or nepheline syenite to synthetic sodalite. In one non-limiting aspect of the invention, the temperature of the reaction is maintained at least about 90° C. In another non-limiting aspect of the invention, the temperature of the reaction is maintained at about 90-140° C. As can be appreciated, higher temperatures can be used. In still another non-limiting aspect of the invention, the temperature of the reaction is maintained at about 90-130° C. In yet another non-limiting aspect of the invention, the temperature of the reaction is maintained at about 100-125° C. The heating of the nepheline and feldspar and/or nepheline syenite and caustic material can be accomplished in a variety of ways. Non-limiting examples include, but are not limited to, the reaction of nepheline and feldspar and/or nepheline syenite and caustic material in 1) an open container, 2) under reflux conditions at atmospheric pressure, 3) under reflux conditions above atmospheric pressure, or 4) under hydrothermal conditions (e.g., in a Parr bomb, etc.). In another and/or alternative embodiment of the invention, the mixture of nepheline and feldspar and/or nepheline syenite and caustic material is agitated at least once during the reaction period to increase the rate of reaction of the nepheline and feldspar and/or nepheline syenite and caustic material during the formation of synthetic sodalite. In one non-limiting aspect of this embodiment, the mixture of nepheline and feldspar and/or nepheline syenite and caustic material is mixed at least once during the reaction period. In another non-limiting aspect of this embodiment, the mixture of nepheline and feldspar and/or nepheline syenite and caustic material is continually mixed during the reaction period. In still another and/or alternative embodiment of the invention, the time of reaction of the mixture of nepheline and feldspar and/or nepheline syenite and caustic material is typically at least about one hour. In one non-limiting aspect of this embodiment, the time of reaction of the mixture of nepheline and feldspar and/or nepheline syenite and caustic material is typically less than about 96 hours; however, longer periods can be used. In another non-limiting aspect of this embodiment, the time of reaction of the mixture of nepheline and feldspar and/or nepheline syenite and caustic material is about 6-72 hours. In another non-limiting aspect of this embodiment, the time of reaction of the mixture of nepheline and feldspar and/or nepheline syenite and caustic material is about 12-36 hours. As can be appreciated, other time periods can be used.

In still another and/or alternative aspect of the present invention, nepheline syenite is primarily used to from the synthetic sodalite. In one non-limiting embodiment of the invention, at least about 75 weight percent nepheline syenite is used to from the synthetic sodalite. In another and/or alternative non-limiting embodiment of the invention, over about 90 weight percent nepheline syenite is used to form the synthetic sodalite. In still another and/or alternative non-limiting embodiment of the invention, over about 95 weight percent nepheline syenite is used to from the synthetic sodalite. In yet another and/or alternative non-limiting embodiment of the invention, about 100 weight percent nepheline syenite is used to from the synthetic sodalite. One non-limiting source of nepheline and feldspar and/or nepheline syenite that can be used to form the hydroxysodalite in accordance with the present invention is offered by Unimin Corporation under the name MINEX® or MINBLOC®.

In still yet another and/or alternative aspect of the present invention, the formed synthetic sodalite is typically separated from the former mixture of nepheline and feldspar and/or nepheline syenite and caustic material. A variety of separation techniques can be used such as, but not limited to, gravity filtration, vacuum filtration, centrifuge, etc. After the formed synthetic sodalite is separated from the former mixture of nepheline and feldspar and/or nepheline syenite and caustic material, the synthetic sodalite is typically washed and dried. The washing of the synthetic sodalite is used to obtain an increased purity of the synthetic sodalite by removing excess caustic and/or removes silica that could precipitated into amorphous silica. As can be appreciated, the washing step is not required, but is desirable. In one non-limiting embodiment of the invention, after the synthetic sodalite has been separated, the synthetic sodalite is washed by a liquid in which the synthetic sodalite has little or no solubility. In one non-limiting aspect of this embodiment, the synthetic sodalite is washed in water (e.g., deionized water, etc.). In another and/or alternative one non-limiting embodiment of the invention, the synthetic sodalite is dried by a non-reactive or substantially non-reactive gas. In one non-limiting aspect of this embodiment, the drying gas is air. In still another and/or alternative one non-limiting embodiment of the invention, the synthetic sodalite is dried at a temperature of at least about 60° C. In one non-limiting aspect of this embodiment, the synthetic sodalite is dried at a temperatures of about 80-300° C. In another and/or alternative non-limiting aspect of this embodiment, the synthetic sodalite is dried at a temperatures of about 100-120° C. As can be appreciated, other drying temperatures can be used.

In a further and/or alternative aspect of the present invention, the formed synthetic sodalite is separated into a certain particle size distribution for use in various types of application. In one non-limiting separation process, the formed synthetic sodalite is air classified.

In still a further and/or alternative aspect of the present invention, nepheline syenite is used to form very pure sodalite. Sodalite is known to incorporate metal ions that will fit into the structure of the sodalite. Indeed, this metal ion incorporation is very efficient. The use of a pure nepheline syenite that contains very few other salts is used to reduce the amount of metal ion incorporation into the formed sodalite so as to form a very pure form of sodalite. One non-limiting source of pure nepheline syenite is Minex®. This type of nepheline syenite is very pure and has very low concentrations of transition metals. The absence of metal ions (e.g., iron) in the Minex® makes the formed product of sodalite very pure and very bright. The formed sodalite is typically more bright than Minex® since some of the impurities in the Minex® are leached out by the caustic treatment that is used to form the sodalite. A controlled particle of nepheline syenite can be used to influence the particle size of the formed sodalite, thereby controlling the size of the formed sodalite. Other factors can also be used to control the particle size of the formed sodalite (e.g., mixing, etc.).

One non-limiting object of the present invention is the provision of a method and process for forming synthetic sodalite from nepheline and feldspar and/or nepheline syenite.

Another and/or alternative non-limiting object of the present invention is the provision of a method and process for forming hydroxysodalite from nepheline syenite.

Still another and/or alternative non-limiting object of the present invention is the provision of a method and process for forming synthetic sodalite at higher conversion percentages.

Yet another and/or alternative non-limiting object of the present invention is the provision of a method and process for forming synthetic sodalite having high purity and brightness.

Still yet another and/or alternative non-limiting object of the present invention is the provision of a method and process for forming synthetic sodalite having a controlled particle size distribution.

These and other objects and advantages will become apparent from the discussion of the present invention.

BRIEF DESCRIPTION OF THE DRAWING

Reference may now be made to the drawings, which illustrate an embodiment that the invention may take in physical form and in certain parts and arrangements of parts wherein;

FIG. 1 is one non-limiting process in accordance with the invention for forming synthetic hydroxysodaite.

DETAILED DESCRIPTION OF THE INVENTION

The present invention is directed to a novel method and process for forming synthetic sodalite from nepheline, and more particularly the formation of hydroxysodalite from nepheline syenite. The method and process of the present invention can be used to form very pure hydroxysodalite, which hydroxysodalite has a high brightness value and controlled particle size distribution.

Referring now to FIG. 1, there is illustrated one non-limiting method for forming hydroxysodalite from nepheline syenite. Step 100 illustrates that purified nepheline syenite is used as one of the staring raw materials used to form hydroxysodalite. One non-limiting general composition of nepheline syenite that can be used by the method and process of the present invention is set forth below in weight percent:

| | |
|---|---|
| $SiO_2$ | 59-62 |
| $Al_2O_3$ | 22-24 |
| $Na_2O$ | 9-12 |
| $K_2O$ | 4-6 |
| $Fe_2O_3$ | <0.2 |
| CaO | <0.5 |
| MgO | <0.1 |
| $TiO_2$ | <0.1 |

As can be appreciated, the general composition of nepheline syenite as set forth above, may slightly vary depending of the particular geographic location the nepheline syenite. As can also be appreciated, the nepheline syenite can include other or additional impurities not identified in the general formula above. The impurity content of the nepheline syenite should be maintained a low levels when a highly bright hydroxysodalite is to be formed. Impurities such as iron ions can combine with the hydroxysodalite and result in a discoloration of the formed hydroxysodalite. This discoloration typically results in a reduction of brightness of the formed hydroxysodalite. Typically, nepheline syenite includes less than 0.5 weight percent free crystalline silica. The average particle size of the nepheline syenite is about 2-20 μm; however, it will be appreciated that other average particle sizes of the nepheline syenite can be used. One non-limiting source of nepheline syenite that can be used to form the hydroxysodalite in accordance with the present invention is nepheline syenite offered by Unimin Corporation under the name MINEX® or MINBLOC®. Non-limiting examples of nepheline syenite that can be used include, but are not limited to, Minex 4, Minex 7, Minex 10, Minex S10, Minex S20, Minex S30, Minex S40, Minbloc HC500, Minbloc HC 1400, Minbloc HC 2000, and/or Minbloc HC 2100. This nepheline syenite has been process and classified to obtain a certain particle size distribution for the nepheline syenite. The particle size distribution of the nepheline syenite used to form hydroxysodalite has been found to have a direct effect of the particle distribution of the form hydroxysodalite. The mixing nepheline syenite with a caustic material also can affect the particle size of the formed hydroxysodalite. As such, if small particle sizes of hydroxysodalite are desired, then nepheline syenite having a small particle size distribution should be used to form the hydroxysodalite.

Referring now to step 110 of FIG. 1, a caustic material such as sodium hydroxide is added to the nepheline syenite. The purity of the sodium hydroxide should be controlled so as to limit or prevent the introduction of impurities into the mixture of sodium hydroxide and nepheline syenite. The concentration level of sodium hydroxide is selected to be more than 30% so as to promote the conversion of nepheline syenite to hydroxysodalite. As illustrated in step 100, the concentration of sodium hydroxide is about 50%. The solution of sodium hydroxide can be formed by adding tablets or pellets of sodium hydroxide (ACS grade) to deionized water; however, it can be appreciated that the solution of sodium hydroxide can be formed in other ways.

The weight percent ratio of sodium hydroxide to nepheline syenite is controlled to achieve the desired conversion percentages of nepheline syenite. In accordance with the method set forth in FIG. 1, the weight percent ratio of solid sodium hydroxide to nepheline syenite in the reaction container is at least about 1:1, generally at least about 2:1, and typically between about 4-10:1.

Referring now to step 120 of FIG. 1, aluminum hydroxide can optionally be added to the mixture of sodium hydroxide and nepheline syenite. The addition of aluminum hydroxide can be used to increase the conversion percentage of nepheline syenite to hydroxysodalite. The addition of aluminum hydroxide to the mixture of sodium hydroxide and nepheline syenite can also be used to reduce the amount of leaching of the silica during the conversion of nepheline syenite to hydroxysodalite. The addition of aluminum hydroxide functions at least in part as an aluminum source during the conversion of nepheline syenite to hydroxysodalite. When aluminum hydroxide is used, the purity of the aluminum hydroxide should be controlled to limit or prevent the introduction of impurities into the mixture of sodium hydroxide and nepheline syenite. The amount of aluminum hydroxide that can be added to the mixture of sodium hydroxide and nepheline syenite is typically about 0.8 grams of aluminum hydroxide to 1 gram of nepheline syenite (Minex®); however, other concentrations of aluminum hydroxide can be used depending on the composition of the nepheline syenite nepheline syenite.

Referring now to steps 130 and 140 of FIG. 1, the mixture of sodium hydroxide and nepheline syenite, and optionally aluminum hydroxide, is mixed and heated. The temperature of the mixture is generally maintained above ambient temperature (i.e., 21° C.). As illustrated in step 130, the mixture is heated to about 100-130° C., and more typically about 110-120° C. Mixture temperatures above 100° C. facilitate in the increased rate of reaction between the mixture of sodium hydroxide and nepheline syenite. At mixture temperatures above 100° C., some nepheline syenite will be converted into hydroxysodalite within about an hour; however, conversion percentages of more than 50% generally take at least about 4 hours, and more typically at least about 8 hours. As such, the time of reaction is typically about 8-72 hours and typically about 8-24 hours to achieve the desired about of conversion of the nepheline syenite into hydroxysodalite. As can be appreciated, reaction times of less than about 8 hours can be used if low conversion percentages are desired. Furthermore, reaction times of greater than 72 hours can be used; however, it is believed that very little nepheline syenite is converted into hydroxysodalite after about 72 hours. During the reaction of the nepheline syenite into hydroxysodalite, the mixture is typically agitated (e.g., stirred, etc.) to increase the rate of reaction of the nepheline syenite into hydroxysodalite. The step of agitating the mixture is optional; however, such process step is used to promote the reaction of nepheline syenite into hydroxysodalite. The step of agitation, when used, can be continuos or periodic during the reaction. The reaction of the nepheline syenite into hydroxysodalite can take place in a variety of reaction vessels. In one non-limiting reaction vessel, the mixture of sodium hydroxide and nepheline syenite, and optionally aluminum hydroxide, is placed in a Parr bomb and stirred at a temperature of about 120° C. for 12-24 hours to achieve a conversion percentage of nepheline syenite to hydroxysodalite of about 70-90%. During the reaction, reflux conditions can be used at about one atmosphere; however, it will be appreciated that other reaction conditions can be used.

Referring now to step 140 of FIG. 1, the synthetically formed hydroxysodalite is separated from the materials remaining in the reaction vessel. Typically this separation step occurs by filtration (e.g., vacuum filtration); however, other or additional separation processes can be used. During the reaction of sodium hydroxide and nepheline syenite, 100% conversion of the nepheline syenite to hydroxysodalite is typically not achieved due to the differences in stoichiometry between the nepheline syenite to hydroxysodalite; however, the addition of an aluminum source ($Al(OH)_3$)) during the reaction can be used to achieve higher conversion percentages. Once the hydroxysodalite has been filled from the other materials in the reaction vessel, the hydroxysodalite is washed and dried as illustrated in step 160 of FIG. 1. The hydroxysodalite is typically thoroughly washed with deionized water; however, other or additional liquids can be used to wash the hydroxysodalite. After the hydroxysodalite has been washed, the hydroxysodalite is typically dried in a heated environment; however, this is not required. The hydroxysodalite can be dried in air at temperatures of more than 100° C. to accelerate the drying process; however, higher or lower drying temperatures can be used. In one non-limiting aspect of the invention, the synthetically formed hydroxysodalite is dried by air at a temperature of about 110-120° C.

Referring now to step 170, the synthetically formed hydroxysodalite can be further processed to obtain the desired particle size of the synthetically formed hydroxysodalite; however, this step is not required. One non-limiting process to obtained a desired particle size distribution is by the use of a single stage or multiple stage air classifier; however, it will be appreciated that other or additional process can e used to obtain the desired particle size.

The novel process of the present invention forms a synthetically formed hydroxysodalite that has a higher aluminum and sodium content than hydroxysodalite that is formed by many prior processes as indicated by x-ray diffraction and FTIR and/or chemical analysis. In addition, the novel process of the present invention forms a synthetically formed hydroxysodalite that has a lower potassium and iron content than hydroxysodalite that is formed by many prior processes. As such, the process of the present invention forms a high purity of hydroxysodalite at very high conversion percentages. This process thus represents a significant advance in the formation of highly pure hydroxysodalite. A few non-limiting advantages of the method and process of the present invention are as follows:

1. Less silica loss during the reaction to form synthetic hydroxysodalite.
2. Higher purity of synthetic hydroxysodalite is formed.
3. Lower iron content of synthetic hydroxysodalite is obtained.
4. High brightness of synthetic hydroxysodalite is formed.
5. Better control of particle size of synthetic hydroxysodalite is achieved. As such a narrow particle range can be obtained.
6. Synthetic hydroxysodalite can be formed from nepheline syenite.
7. High conversation percentages from nepheline syenite to synthetic hydroxysodalite.

Table 1 which is set forth below illustrates the properties of synthetic hydroxysodalite that were obtained from nepheline syenite in accordance with one non-limiting method and process of the present invention. The source of nepheline syenite used was Minex 4 which is sold by Unimin Corporation. The nepheline syenite was treated with 50 wt % NaOH for about 24 hours under reflux conditions at about 1 atm. at a temperature of about 120° C. The weight percent ratio of solid NaOH to nepheline syenite was about 4.8:1. A conversion percentage of nepheline syenite to synthetic hydroxysodalite of more than 70% was obtained.

TABLE 1

| Crystallographic Phase | Hydroxysodalite + albite + traces of other feldspar phases. |
|---|---|
| Particle Shape (SEM) | Block |
| Particle size (microns), Light scattering | |
| Mean size | 6.6 |
| D50 | 5.6 |
| D10 | 2.7 |
| D90 | 12.1 |
| Particle size (microns), SEM, only Hydroxysodalite | ~1 |
| Specific surface area (m$^2$/g), BET | 2.7 |
| Oil absorption (g/100 g filler), ASTM D281-84 | 50.7 |
| pH (10 wt % in water) | 10.4 |
| Brightness, Tappi T525 | 93.5 |
| Refractive Index | 1.5 |
| Bulk density (g/ml) | 0.661 |
| Moisture loss at 105° C. | 0.90% |
| Weight loss at 1000° C. | 8.50% |

The composition in weight percent of the synthetic hydroxysodalite formed in Table 1 as determined by ICP measurements is as follows:

| | |
|---|---|
| $SiO_2$ | 48% |
| $Al_2O$ | 28% |
| $Na_2O$ | 23% |
| $K_2O$ | <0.1% |
| $Fe_2O_5$ | <0.1% |
| CaO | <0.5% |
| MgO | <0.1% |

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A method for forming synthetic hydroxysodalite from nepheline comprising the steps of:
   a) providing a source of nepheline and feldspar;
   b) providing a solution of caustic material;
   c) combining together the source of nepheline and feldspar and solution caustic material to form a reaction mixture; and,
   d) separating synthetic hydroxysodalite from said reaction mixture after a period of time.

2. The method as defined in claim 1, wherein said source of nepheline and feldspar includes nepheline syenite.

3. The method as defined in claim 2, wherein said source of nepheline and felspar includes at least about 90 weight percent nepheline syenite.

4. The method as defined in claim 2, wherein said solution of caustic material includes sodium hydroxide.

5. The method as defined in claim 4, wherein a weight ratio of solid caustic material to nepheline is at least about 2:1.

6. The method as defined in claim 5, including the step of heating reaction mixture to a temperature of at least about 90° C.

7. The method as defined in claim 6, wherein said period of time is at least about one hour.

8. The method as defined in claim 1, wherein said solution of caustic material includes sodium hydroxide.

9. The method as defined in claim 8, wherein said solution of caustic material includes at least about 40 weight percent sodium hydroxide.

10. The method as defined in claim 1, wherein a weight ratio of solid caustic material to nepheline is at least about 2:1.

11. The method as defined in claim 10, wherein a weight ratio of solid caustic material to nepheline is at least about 4:1.

12. The method as defined in claim 1, including the step of heating reaction mixture to a temperature of at least about 90° C.

13. The method as defined in claim 12, including the step of heating reaction mixture to a temperature of about 110-140° C.

14. The method as defined in claim 1, wherein said period of time is at least about one hour.

15. The method as defined in claim 14, wherein said period of time is at least about twelve hours.

16. The method as defined in claim 1, wherein said step of separating synthetic hydroxysodalite from said reaction mixture includes a vacuum filtration process.

17. The method as defined in claim 1, including the step of washing said synthetic hydroxysodalite after said separation step.

18. The method as defined in claim 17, wherein said step of washing includes the application of deionized water on said synthetic hydroxysodalite.

19. The method as defined in claim 17, including the step of drying said synthetic hydroxysodalite after said washing step.

20. The method as defined in claim 19, wherein said step of drying includes the use of heated air.

21. The method as defined in claim 1, including the step of classifying said synthetic hydroxysodalite to obtain a desired particle size distribution of said synthetic hydroxysodalite.

22. The method as defined in claim 1, including the step of adding an aluminum source to said reaction mixture.

23. A method for forming synthetic hydroxysodalite from nepheline comprising the steps of:
   a) providing a source of nepheline syenite having an average particle size of about 2-20 μm
   b) providing a 40-60 weight percent solution of sodium hydroxide;
   c) combining together the source of nepheline syenite and solution of sodium hydroxide to form a reaction mixture, a weight ratio of solid sodium hydroxide to nepheline syenite is 4-10:1;

d) heating said reaction mixture at about 100-130° C. for about 8-72 hours until a conversion percentage of nepheline syenite to synthetic hydroxysodalite of least about 60% is achieved;

e) separating said synthetic hydroxysodalite from said reaction mixture; and, f) washing and drying said separated synthetic hydroxysodalite.

24. The method as defined in claim 23, wherein said step of separating synthetic hydroxysodalite from said reaction mixture includes a vacuum filtration process.

25. The method as defined in claim 23, wherein said step of washing includes the application of deionized water on said synthetic hydroxysodalite.

26. The method as defined in claim 23, wherein said step of drying includes the use of heated air.

27. The method as defined in claim 23, including the step of classifying said synthetic hydroxysodalite to obtain a desired particle size distribution of said synthetic hydroxysodalite.

28. The method as defined in claim 23, including the step of adding aluminum hydroxide to said reaction mixture.

* * * * *